United States Patent [19]
Zankl

[11] 3,856,114
[45] Dec. 24, 1974

[54] AUTOMATIC LUBRICATION SYSTEM

[75] Inventor: Frank Zankl, Milwaukee, Wis.

[73] Assignee: Kearney & Trecker Corporation, West Allis, Wis.

[22] Filed: Jan. 29, 1973

[21] Appl. No.: 327,418

[52] U.S. Cl. ............... 184/6.1, 184/1 E, 184/7 R
[51] Int. Cl. ... F01m 1/00, F16n 17/06, F16n 29/00
[58] Field of Search .......... 184/6.1, 1 R, 1 E, 15 A, 184/6 R, 6, 7 R; 307/225

[56] References Cited
UNITED STATES PATENTS

| | | | |
|---|---|---|---|
| 3,165,171 | 1/1965 | Baeriswyl | 184/3 R |
| 3,356,990 | 12/1967 | Sloughter | 184/6 |
| 3,376,951 | 4/1968 | Bosworth | 184/6 |
| 3,456,761 | 7/1969 | Woor | 184/7 R |
| 3,463,268 | 8/1969 | Krause | 184/6.1 |
| 3,497,034 | 2/1970 | Eddy | 184/1 R |
| 3,561,565 | 2/1971 | Woor | 184/7 D |
| 3,578,112 | 5/1971 | Freeland | 184/6.1 |
| 3,674,112 | 7/1972 | Roberts | 184/6.1 |

Primary Examiner—Manuel A. Antonakas
Assistant Examiner—Daniel J. O'Connor
Attorney, Agent, or Firm—Cyril M. Hajewski

[57] ABSTRACT

An automatic lubrication system employs a digital computer programmed to determine the amount of lubrication required by the drive for each axis of a multi-axis to control a valve for each axis for supplying lubricating fluid independently to each axis in accordance with the feed-rate of the drive for each axis.

6 Claims, 4 Drawing Figures

000
AUTOMATIC LUBRICATION SYSTEM

BACKGROUND OF THE INVENTION

1. Field of the Invention

The present invention relates to a system for automatically lubricating the drive of a heavy duty machine, and more particularly to such a system which employs a digital computer for periodically calculating the amount of lubrication required by the drive.

2. The Prior Art

It is necessary to lubricate the feed screws and the ways of heavy duty machines in order to minimize wear of the parts and to minimize the power requirement for driving the machines. The amount of lubrication required varies with the load to which the machine is subjected. Normally, the amount of lubrication required is proportional to the feed-rate of the machine drive. For a multi-axis machine, each axis may have a different feed-rate, so that the lubrication requirement may be different for each axis. Heretofor, it has been conventional to maintain a constant stream of lubricant directed onto the drive whenever the machine is in operation. While such a system serves the purpose of lubricating the machine, it is relatively inefficient, because the lubrication supplied to the drive is not related to the lubrication needs, especially when the machine is running at slow speeds. Accordingly, it is desirable to provide a system for more efficiently dealing with the lubrication requirements of the machine.

SUMMARY OF THE INVENTION

It is a principal object of the present invention to provide an automatic lubrication system whereby the quantity of lubrication needed by the machine drive is periodically and automatically calculated, and lubrication is automatically applied in accordance with the quantity needed at any given time.

Another object of the present invention is to provide such a system in which the proper amount of lubrication is supplied simultaneously to all of the drive axes of the machine.

Another object of the present invention is to provide a program for a digital computer whereby the amount of lubrication required is automatically determined.

A further object of the present invention is to provide an automatic lubrication system in which the drive of a machine is lubricated automatically in accordance with the feed-rate of the machine drive, with the lubrication applied to each axis of the machine being independently responsive to the feed-rate of that axis.

These and other objects and advantages of the present invention will become manifest upon an examination of the following description and the accompanying drawings.

In one embodiment of the present invention there is provided storage means for manifesting the feed-rate of a machine, a computer connected to the storage means and responsive thereto for producing a signal which periodically opens a flow control valve interposed between a source of lubricant and the machine drive, the proportion of the time the valve is open being proportional to the feed-rate of the machine.

BRIEF DESCRIPTION OF THE DRAWINGS

Reference will now be made to the accompanying drawings in which.

DESCRIPTION OF THE PREFERRED EMBODIMENT

Figure 1:
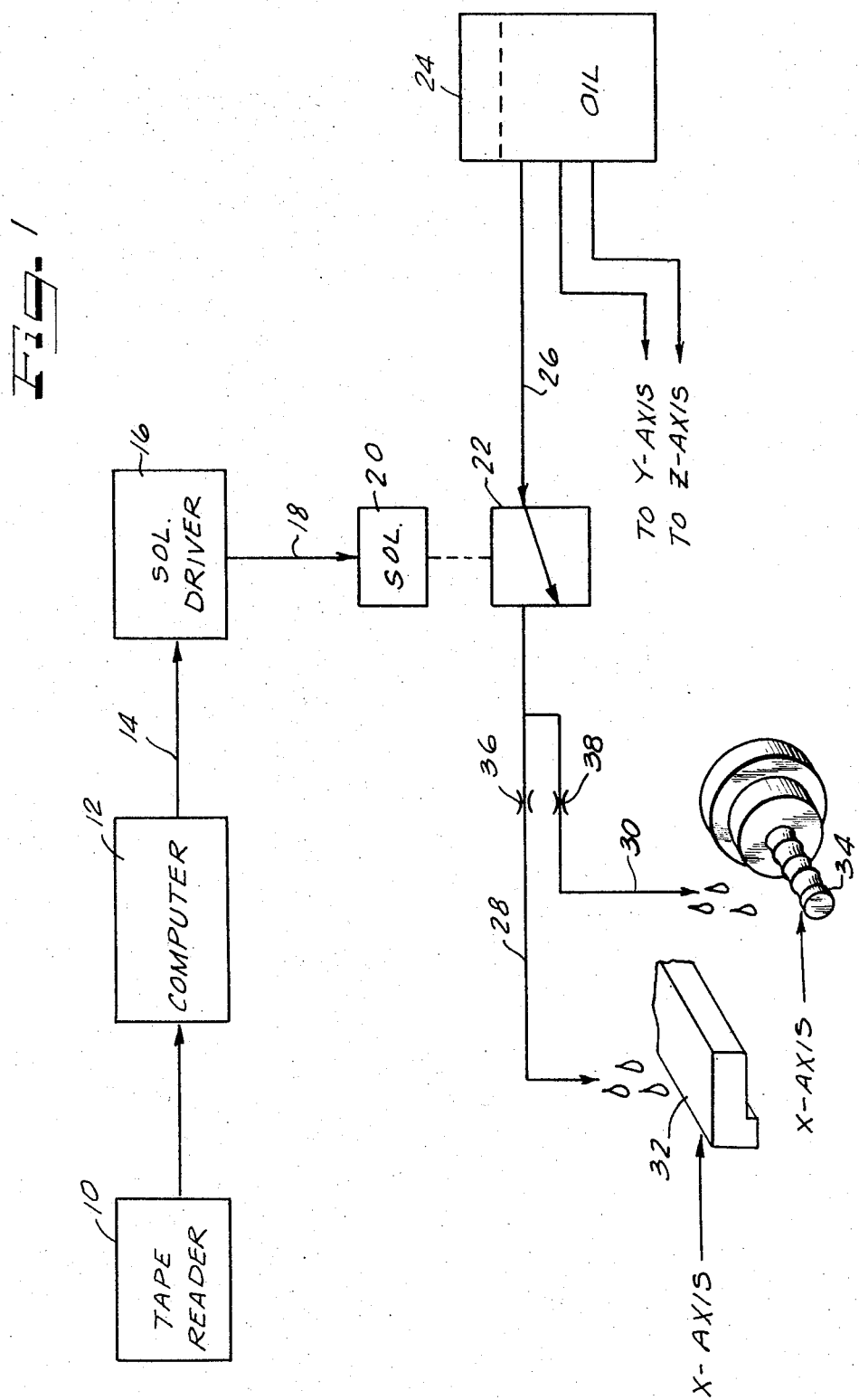
FIG. 1 is a functional block diagram of an automatic lubrication system incorporating an illustrative embodiment of the present invention.

Reference will now be made to FIG. 1 which shows, in functional block diagram form, a tape reader 10, connected to the input of a digital computer 12. An output of the computer 12 is connected by an output lead 14 to a solenoid driver 16. The solenoid driver 16 is connected by an output lead 18 to a solenoid 20, which is mechanically connected to a valve 22, which is interposed in the flow stream of lubricant flowing from a source 24 of lubricant through a line 26 to the valve 22, and from there through lines 28 and 30 to the place where lubrication is desired. The line 28 terminates above one of the ways 32 of the machine, the way illustrated in FIG. 1 being that provided for the X axis of the machine. The line 30 terminates above the drive screw 34 for the X axis. The flow control mechanism 36 is included in the line 28 and a similar flow control mechanism 38 is included in the line 30, and the flow control mechanisms 28 and 30 are adjusted to select the desired flow rates of lubricant for lubricant supplied to the way 32 and to the screw 34, when the valve 22 is open.

The computer 12 automatically energizes the solenoid driver 16 when lubrication is required for the X axis of the machine drive. Although not illustrated, a similar solenoid driver and valve assembly are provided for the Y and Z axes of the machine. The function of the computer 12 is to determine, from the input furnished to it from the tape reader 10, the amount of lubrication required by each axis. It does this by carrying out a program which results in the solenoid driver 16 being furnished with periodic pulses, each of which opens the valve 22 for a predetermined period of time, so that the amount of lubrication applied to the way 32 and to the screw 34 is a linear function of the feed-rate of the X axis drive. The quantity of lubricant supplied to the other solenoid drivers are calculated from the feed rates of the other axes. The feed-rate in each case, is part of the input data supplied to the drive by the tape reader in the form of instructions and the like. The machine drive is preferably controlled by the computer 12 in response to the instructions from the tape reader 10, but may alternately be controlled by other apparatus (not shown) which is responsive to the tape reader 10 directly. As the particular form of control of the machine driver for the various axes form no part of the present invention, they are not described herein.

Figure 2:
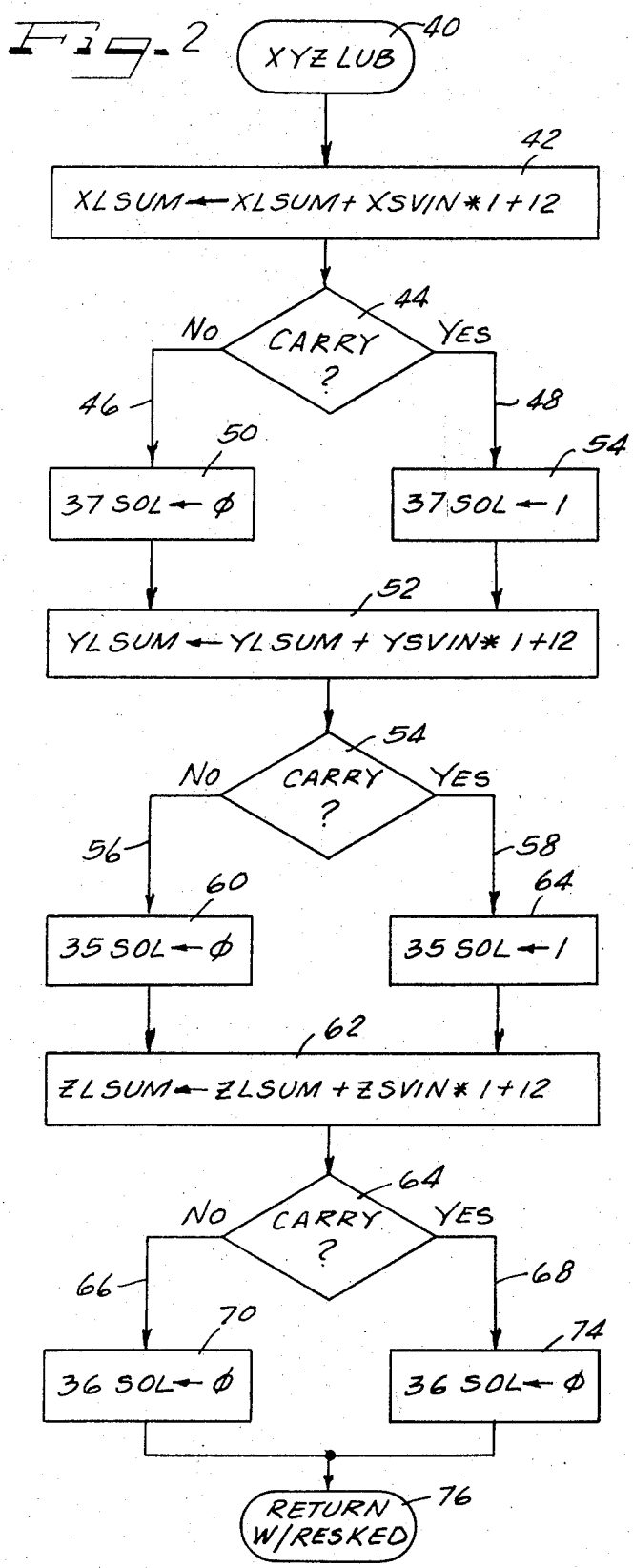
FIG. 2 is a flow-chart of a program which is employed in the computer incorporated in the apparatus of FIG. 1.

The program carried out by the computer 12 is illustrated in FIG. 2. The program is entered from the executive routine by way of a step 40 (FIG. 2), which receives control from the executive routine of the computer and passes control to the step 42. In the step 42, a quantity is derived by adding to the quantity stored in storage location XLSUM, a quantity XSVIN derived from the tape reader 10 and which is representative of the feed rate of the X axis, and adding to that sum the quantity 12. The quantity 12 is an octal (base-8) quantity equal to decimal 10. The total is then stored in location XLSUM. When the function of the step 42 is carried out, a new value is derived for the quantity stored in XLSUM, and control passes to a step 44.

The step 44 examines whether the addition of the step 42, which calculated a new quantity stored in XLSUM, was accompanied by an overflow from the XLSUM storage location. If no overflow (or carry) has occurred, a branch 46 is selected, and a 0 is inserted into the 37SOL storage location by a step 50. If a carry has occurred, a branch 48 is selected, and a 1 is set into the storage location 37 SOL by a step 54. The storage location 37SOL holds one bit of an output word which is periodically read out from the computer 12 to an output register. When the bit in the output register corresponding to the storage location 37SOL is equal to 1 the solenoid driver 16 of the X axis is energized, and this energization is maintained until the program is performed again subsequently, at which time the storage location 37SOL is set to 0, resulting in a 0 bit in the output word corresponding to that storage location, and the solenoid driver 16 is deenergized The solenoid driver 16 remains unenergized, as long as the bit in the output register corresponding to 37SOL remains 0. Control eventually passes to a step 52, via step 50 or step 54, depending upon which branch is selected by the step 44.

The step 52 calculates a quantity by adding to the quantity formerly stored at location YLSUM, a new quantity identified as YSVIN, and adds to that sum a quantity 12. The YSVIN quantity is proportional to the feed-rate of the Y axis. This operation is identical to the operation carried out by the step 42, except that the sum calculated thereby is stored at location YLSUM. After the step 52, the step 54 identifies whether or not an overflow or carry has occurred during step 52, and if not, the branch 56 is selected and a step 60 is performed, setting the storage location 35SOL to 0, which in turn sets the output bit which is responsible for energizing the solenoid and driver 16 of the Y axis to 0. If an overflow has occurred during step 52, the branch 58 is selected and the step 64 is performed, to set the output bit for the solenoid driver for the Y axis to 1.

After either step 64 or the step 60, control passes to a step 62, which calculates a new quantity for the storage location ZLSUM. The operation of the step 62 is identical to that described above in connection with the step 42 and the step 52, except that the calculated sum is stored in a different storage location, and is calculated from the ZSVIN quantity supplied by the tape reader 10 for the feed-rate of the Z axis. Thereafter, the ZLSUM quantity is inspected for a carry or overflow and if none occurs control passes over a branch 66 to a step 70. If an overflow has occurred, control passes over a branch 68 to step 74. The steps 70 and 74 are identical to the steps 50 and 54 and the steps 60 and 64, which have been described above, except that the output bit which is set either to 1 or 0 is the one which controls the solenoid driver for the Z axis. After the steps 70 or 74, control returns via step 76 to the executive routine.

Figure 3:
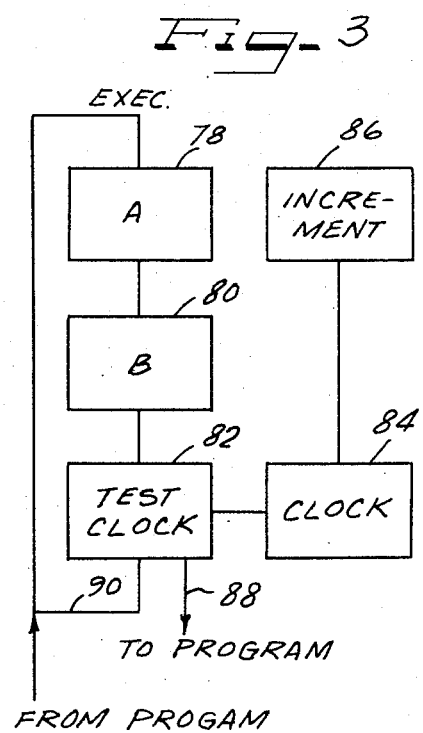
FIG. 3 is a flow-chart of a computer program illustrating how the program of FIG. 2 may be performed by a general purpose computer.

A schematic illustration of the executive routine is illustrated in FIG. 3. The executive routine includes a step 78, and a step 80 which is performed following the step 78. Following the step 80, control passes to a step 82 which functions to test the state of a clock unit 84. The clock unit 84 is connected to a unit 86 which functions to increment the clock 84 continuously at a constant rate so that the state of the clock 84 represents real time. The operation of the step 82 normally results in selection of a branch 90, but periodically, a branch 88 is selected. In one preferred embodiment the branch 88 is selected once each 2.13 seconds, and this time interval is determined by inspecting the state of the clock unit 84. When the branch 90 is selected, in response to the operation of the step 82, control is returned to the executive routine step 78. The steps 78 and 80 are merely illustrative of a large number of program steps performed by the executive routine, in order to perform other operations not related to the present invention.

When the branch 88 is selected, the program of FIG. 2 is entered, and after the program of FIG. 2 is completed, control is returned to the branch 90 of the executive routine by the step 76 (FIG. 2).

Figure 4:
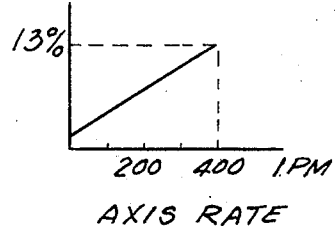
FIG. 4 is a graph showing the amount of lubrication furnished to the drive of the machine, relative to feed-rate.

In FIG. 4 the result of the operation of the program of FIG. 2 is illustrated for one axis. At a feed-rate of zero (when the machine is stationary relative to that axis), the percentage of the time that the lubrication system is operative (viz. the percentage of the time that the valve 22 is open) is small. As the feed-rate increases, the percentage of the time that the lubrication system is operative rises to about 13 percent when the feed-rate is 400 inches per minute, which is the maximum feed-rate for one particular machine.

The percentage of time that the lubrication system is turned on is the ratio of the lubrication duration (2.13 seconds) to the period of the cyclical operation of the lubrication system. When the feed-rate is zero, this period is approximately 14 ½ minutes, which is determined by the period required for the quantity stored in XLSUM, for example, to overflow as it is augmented by 12 every 2.13 seconds. The storage location XLSUM can accommodate a quantity as large as approximately 4,100 before an overflow occurs, so that the addition of octal 12 (or decimal 10) each 2.13 seconds, while XSVIN is zero, brings about an overflow every 14 ½ minutes. When the feed-rate of the X axis is not zero, the quantity XSVIN is added to the storage location SLSUM, with the result that quantity stored in this location increases more rapidly and overflows more frequently. As the Y and Z axes are handled in the same manner, the lubrication of those axes is also about once in 14 ½ minutes when the feed-rate is zero, and about 13 percent of the time when the feed-rate increases to 400 inches per minute.

Although the present invention may be carried out employing any general purpose digital computer, in one embodiment the computer 12 employed is a Digital Equipment Corp. PDP8, for which the following program, expressed in machine language, is preferred for carrying out the program of FIG. 2:

| 16730 | 007000 | XYZLUM: NOP/AUTOMATIC AXIS LUB. |
| 16731 | 001357 | TAD XYZLBT |
| 16732 | 003173 | DCA TEMP3 |
| 16733 | 004520 | JMS I TADOF |
| 16734 | 000160 | XSVIN |
| 16735 | 004363 | JMS XYZLAS |
| 16736 | 003337 | DCA .+1 |
| 16737 | 004502 | JMS I DWPITI |

| | | -Continued |
|---|---|---|
| 16740 | 000153 | 37SOL |
| 16741 | 004520 | JMS I TADOF |
| 16742 | 000161 | YSVIN |
| 16743 | 004363 | JMS XYZLBS |
| 16744 | 003345 | DCA .+1 |
| 16745 | 004502 | JMS I DWRIT1 |
| 16746 | 000151 | 35SOL |
| 16747 | 004520 | JMS I TADOF |
| 16750 | 000162 | ZSVIN |
| 16751 | 004363 | JMS XYZLBS |
| 16752 | 003353 | DCA .+1 |
| 16753 | 004502 | JMS I DWRIT1 |
| 16754 | 000152 | 36SOL |
| 16755 | 001043 | TAD BIT3 |
| 16756 | 005730 | JMP I XYZLUR |
| 16757 | 006760 | XYZLBT, XLSUM |
| 16760 | 000000 | XLSUM, 0 |
| 16761 | 000000 | 0 |
| 16762 | 000000 | 0 |
| 16763 | 007000 | XYZLBS, NOP |
| 16764 | 007510 | SPA |
| 16765 | 007041 | CIA |
| 16766 | 007100 | CLL |
| 16767 | 001070 | TAD 12 |
| 16770 | 001573 | TAD I TEMP3 |
| 16771 | 003573 | DCA I TEMP3 |
| 16772 | 002173 | ISZ TEMP3 |
| 16773 | 007430 | SZL |
| 16774 | 007101 | CLL IAC |
| 16775 | 001127 | TAD JMSIWO |
| 16776 | 005763 | JMP I XYZLRS |

Although the present invention is described above in an embodiment which uses a general purpose digital computer, it is evident that the present invention may alternatively take the form of a special purpose computer, in which the various storage locations, such as XLSUM and the like, of the computer 12, are replaced by individual registers. The portion of the program of FIG. 2, which repeatedly calculates new values for XLSUM and the like, by adding XSVIN and 12 periodically, remains the same, and is performed periodically in response to the clock 84. Of course, no executive routine is involved in such a case. The overflow outputs of the several registers may be connected directly to output flip-flops, instead of setting bits in the output register, as described above. Each of the output flip-flops is then connected to its respective solenoid driver to control its respective valve.

What is claimed is:

1. A method of automatically lubricating a drive of a machine tool comprising the steps of determining the feed-rate of said drive by reading a record that is connected to control the operation of said drive, periodically adding a quantity to a counter in response to said reading which quantity bears a linear relation to the feed-rate of said drive as read from said record, and operating a valve in a conduit interconnecting a source of lubricant with said drive for a predetermined time interval each time said counter overflows whereby the lubricant is made available to said drive at substantially the same time that the drive is being activated in response to the data from said record.

2. A machine tool having movable members and an automatic lubrication system for lubricating the movable members comprising, a source of lubricating fluid, a conduit interconnecting said source to the movable members that are to be lubricated, a valve connected to normally interfere with the flow of fluid through said conduit, said valve being actuatable to the open condition to admit the flow of fluid through said conduit, a record containing a program defining a cycle of operations for the movable members of the machine tool, a reader connected to read the information on said record, a control circuit connected to regulate the operation of said movable members in response to the information read by said reader, means connected to actuate said valve in response to the information read by said reader to open said valve for the application of lubricant to the movable members in accordance with the requirements for lubrication as determined by the operation called for by said record so that the lubricant is supplied to the movable members at substantially the same time that they are activated in response to the information read from said record.

3. An automatic lubrication system according to claim 2 wherein the lubricant is to be applied to a drive mechanism for driving a movable member of the machine, and said valve actuating means functions to open said valve so that the amount of lubricant applied to the drive mechanism per unit of time increases as the feed rate of said movable member specified by said record increases.

4. An automatic lubrication system according to claim 2 including a computer in said control circuit, means connecting said computer with said reader to enter the information on said record into said computer, and means in said computer for producing an output signal that regulates the operation of said valve in accordance with the information received from said reader to thereby control the lubrication applied to said movable members of the machine.

5. An automatic lubrication system according to claim 2 wherein said valve actuating means includes a register for manifesting a sum, means for incrementing the sum in said register periodically with a quantity that is determined by the operation that is specified by said record and identified in said control circuit by said reader, means to produce an output pulse each time said register overflows in response to said incrementing, and means for applying said output pulse to actuate said valve for admitting lubricant in accordance with the operation of said movable members.

6. An automatic lubrication system according to claim 5 including, means connected to add a fixed sum to said register when said record does not call for the operation of said movable members so that a quantity of lubricant will be supplied to said member periodically even when the member is idle.

* * * * *